United States Patent [19]

Doyel

[11] E Patent Number: Re. 32,184

[45] Reissued Date of Patent: Jun. 17, 1986

[54] SEWING BOX

[76] Inventor: John S. Doyel, 404 W. 20th St., New York, N.Y. 10011

[21] Appl. No.: 727,929

[22] Filed: Apr. 26, 1985

Related U.S. Patent Documents

Reissue of:

[64] Patent No.: 4,504,000
Issued: Mar. 12, 1985
Appl. No.: 465,791
Filed: Feb. 11, 1983

[51] Int. Cl. ..... A45F 3/48
[52] U.S. Cl. ..... 223/107; D3/25
[58] Field of Search ..... 206/45.11, 38; 312/287, 312/285, 290, 244, DIG. 33; 223/107; D3/20, 21, 25, 30.1, 35, 38

[56] References Cited

U.S. PATENT DOCUMENTS

| | | | |
|---|---|---|---|
| 1,011,056 | 12/1911 | Hodgson | 206/45.11 |
| 3,995,929 | 12/1976 | Kessler, Sr. | 312/244 X |
| 4,285,556 | 8/1981 | Loeffel | 312/244 |

*Primary Examiner*—Werner H. Schroeder
*Assistant Examiner*—Andrew M. Falik
*Attorney, Agent, or Firm*—Cooper, Dunham, Clark, Griffin & Moran

[57] ABSTRACT

A sewing box assembled by hand from a minimal number of components molded from thermoplastic material. It includes a central tray, spool panels hinged to opposite sidewalls of the central tray and a pair of sidetrays hinged to the remaining sidewalls of the central tray. When the sidetrays and spool panels are pivoted to their open positions, the box has a cross-shaped configuration allowing access to sewing accessories in or on the spool panels, side trays and central tray. When the sidetrays and spool panel are moved to their closed position, the box is highly compact for the amount of storage it provides.

12 Claims, 16 Drawing Figures

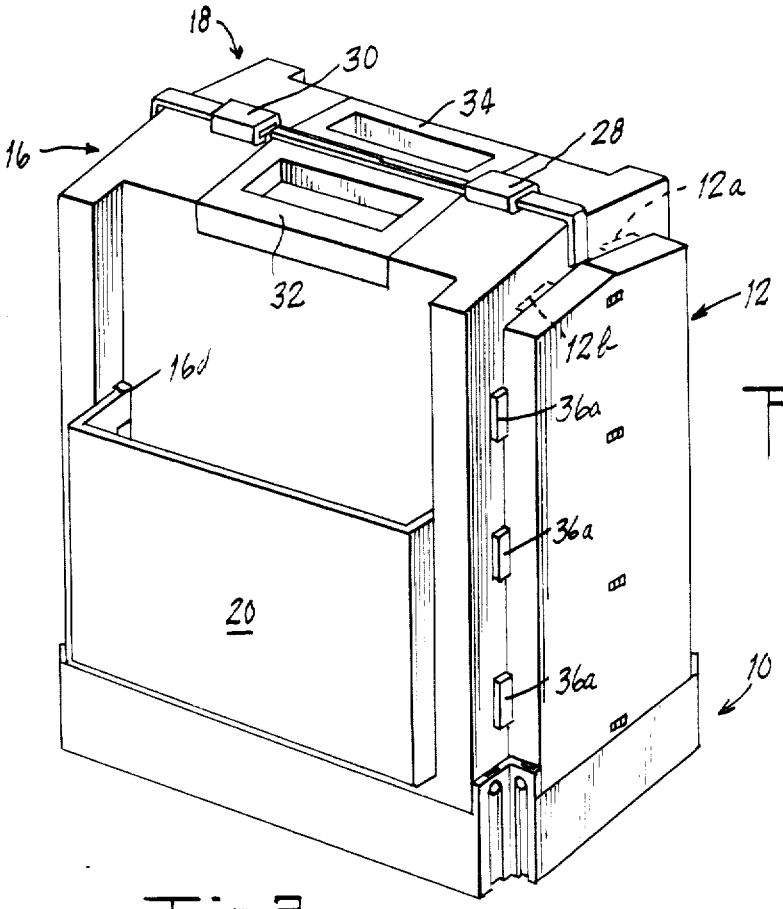
Fig. 1.
Fig. 2.
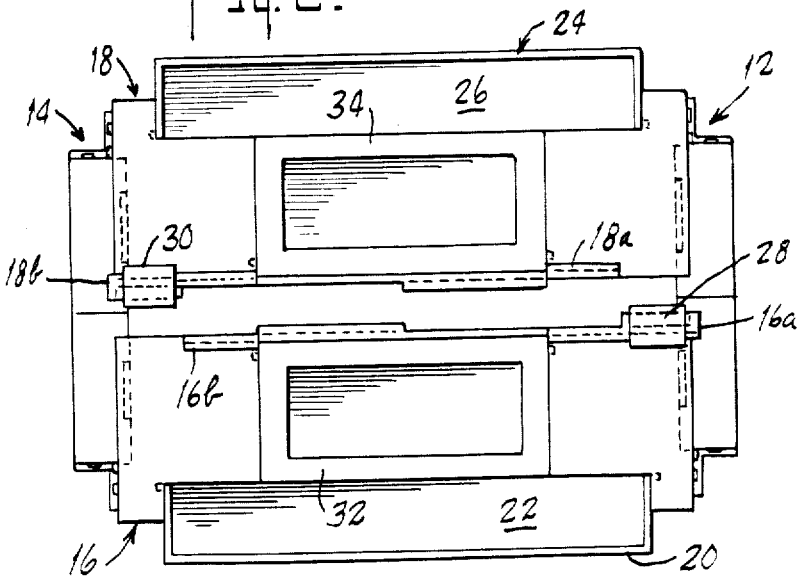
Fig. 3.
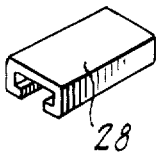

Fig. 9.
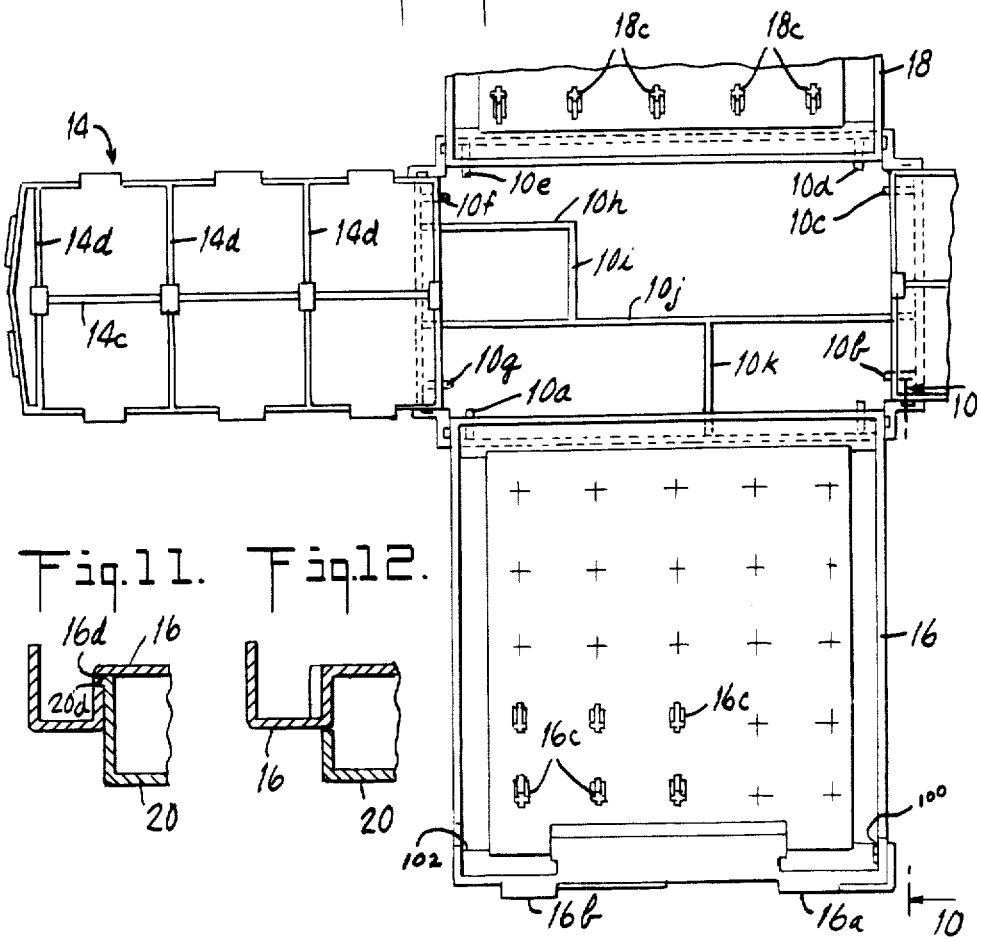
Fig. 11.
Fig. 12.
Fig. 10.
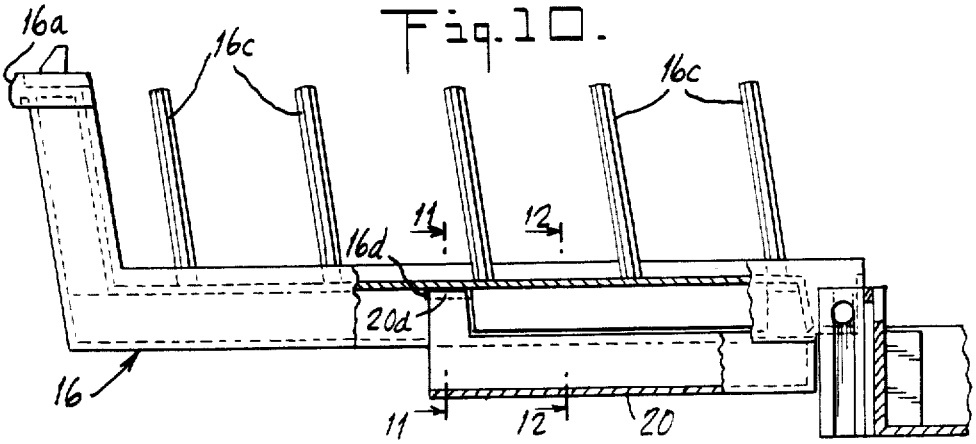

Fig. 13.
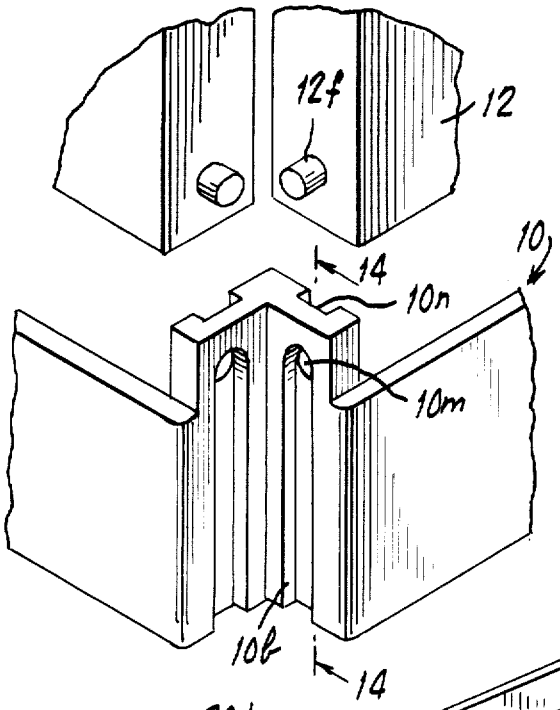
Fig. 14.
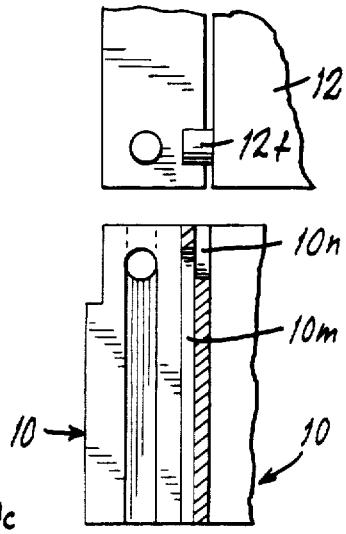
Fig. 15.
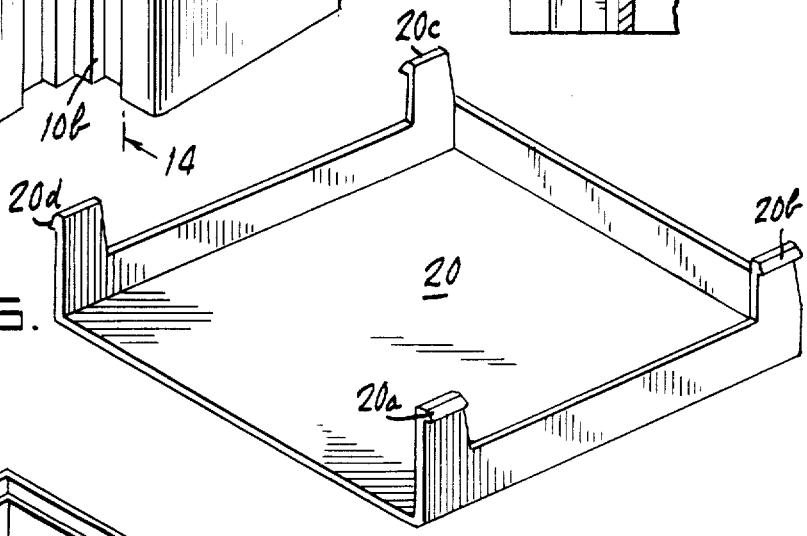
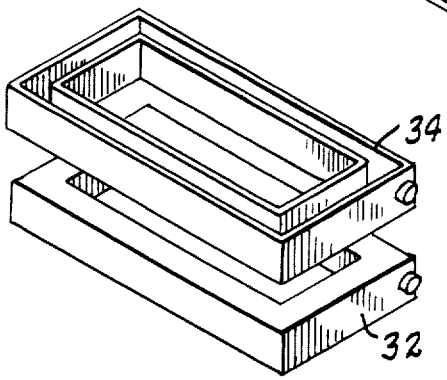
Fig. 16.

SEWING BOX

Matter enclosed in heavy brackets [ ] appears in the original patent but forms no part of this reissue specification; matter printed in italics indicates the additions made by reissue.

BACKGROUND AND SUMMARY OF THE INVENTION

The invention is in the field of containers for sewing accessories and is directed to providing a sewing box which provides a number of user conveniences at low cost.

Sewing boxes have been used for a long time, and range from the rudimentary open box for a few accessories to the elaborate cabinet the size of a large piece of furniture. Some examples of sewing cabinets, as well as other containers which have hinged side panels, are illustrated in the following U.S. Pat. Nos.: Des. 98,380; Des. 154,422; Des. 191,029; Des. 194,333; Des. 248,194; Des. 155,246; 406,996; 1,378,614; 2,226,693; 2,432,914; 2,443,132; 2,564,949;3,245,573.

It is believed that the known prior art in this field has not fully succeeded in combining a sufficient number of user conveniences in a sewing box which is compact when closed, to be easy to store and transport, but can still store a great number of sewing accessories and yet can be made available at low cost. It is believed that a need exists for such a sewing box, and this invention is directed to meeting that need.

In an exemplary and non-limiting embodiment of the invention, the sewing box comprises a rectangular central tray, a pair of spool panels hinged to a pair of opposite sidewalls of the central tray and a pair of sidetrays hinged to the two remaining sidewalls of the central tray, such that when the sidetrays and spool panels are pivoted to their open positions, the box has a cross-shaped configuration allowing convenient access to the sewing accessories in or on the spool panels, sidetrays and central tray, and when the sidetrays and spool panels are moved to their closed positions, the box is highly compact for the amount of storage it provides.

The sewing box provides a high number of user conveniences. For example, the central tray and the sidetrays are divided into a number of compartments, and each compartment in the sidetrays has its own clear plastic lid which locks in place to retain the compartment contents even when the sidetray is upright or tipped. The spool trays have spool spindles that point slightly up when the spool trays are upright, to keep the spools from sliding off by gravity. Although the two spool panels are identical to each other, the array of spool spindles on each is slightly off-center such that when the spool panels are brought to their upright, closed positions, the free end of one spool spindle keeps a spool on the opposite spool spindle from sliding off even if the box is tipped. The central tray provides independent support for each sidetray or spool panel which is in its upright position such that it can remain upright even without support from the remaining sidetrays or spool panels. When the spool panels are brought to their upright, closed positions, they can be locked together by manually operable slide locks. If at the time the sidetrays are also in their upright, closed positions, they interlock with the spool panels to keep the box closed and locked. However, the sidetrays can remain open for use while the spool panels are closed and locked, and the sidetrays can thereafter be pivoted to their closed positions and snaplocked with the spool panels. Conversely, when the spool panels are closed and locked with each other and the sidetrays, a sidetray can be released, to be moved to its open position, by slightly deforming it to release it from its snap lock connection with the spool panels, which remain locked to each other. The clear plastic lids for the sidetray compartments have tabs which extend outwardly beyond the sidetray and serve two functions: they facilitate opening the compartment, and they press again the outside of the spool panels when the box is closed so as to prevent the sidetrays from being pushed further into the closed box. A hinged handle is attached to the top end of each spool panel to fold flush with the box for easier storage and shipment. External pockets for items such as magazines and patterns can be formed by snapping pocket panels onto the outside of the spool panels.

The manufacturing cost of the sewing box is minimized by an innovative combination of features. For example, the sidetrays are identical to each other, and the spool panels are also identical to each other, thereby allowing manufacture by a mold having cavities only for a single sidetray and a single spool panel, or, if a mold with cavities for two sidetrays and two spool panels is used, allowing for interchangeability of molded components and for less expensive mold cutting. For the same reasons, the handles are identical to each other, and so are the slide locks and sidetray compartment lids and lid-retaining pins. The pivotal connections between the central tray and the sidetrays and spool panels is by means of integrally molded hinge pins which fit within hinge openings in the central tray that are also integrally molded, but without the use of hole-making cams in the mold cavity for the central tray, to thereby reduce the cost of making the mold. The clear plastic lids for the compartments in the sidetrays are also pivotally secured by means of integrally molded hinge pins and hinge openings formed by a snap lock connection between T-shaped pins and ribs integrally molded in the sidetrays. The entire sewing box can be assembled by hand, without the use of any tools, fasteners or adhesives.

BRIEF DESCRIPTION OF THE DRAWINGS

FIG. 1 is a perspective view of a closed sewing box embodying the invention.

FIG. 2 is a top plan view showing the sewing box with slightly opened spool panels.

FIG. 3 is a perspective view of a slide lock used for locking the spool panels to each other.

FIG. 9 is a partial top plan view of the sewing box when opened.

FIG. 10 is a sectional view along line 10—10 of FIG. 9.

FIG. 11 is a partial sectional view along line 11—11 in FIG. 10.

FIG. 12 is a partial sectional view along line 12—12 of FIG. 10.

FIG. 13 is an exploded view of the lower near corner of the sewing box in FIG. 1 illustrating the hinge pins and holes for a pivotal connection between the central tray of the sewing box and its sidetrays and spool panels.

FIG. 14 is a partial sectional view along line 14—14 of FIG. 13.

FIG. 15 is a perspective view of a panel which can be snaplocked onto a spool panel to form an external pocket for items such as magazines and patterns.

FIG. 16 is an exploded perspective view of handles for the sewing box.

DETAILED DESCRIPTION OF THE PREFERRED EMBODIMENT

Figure 4:
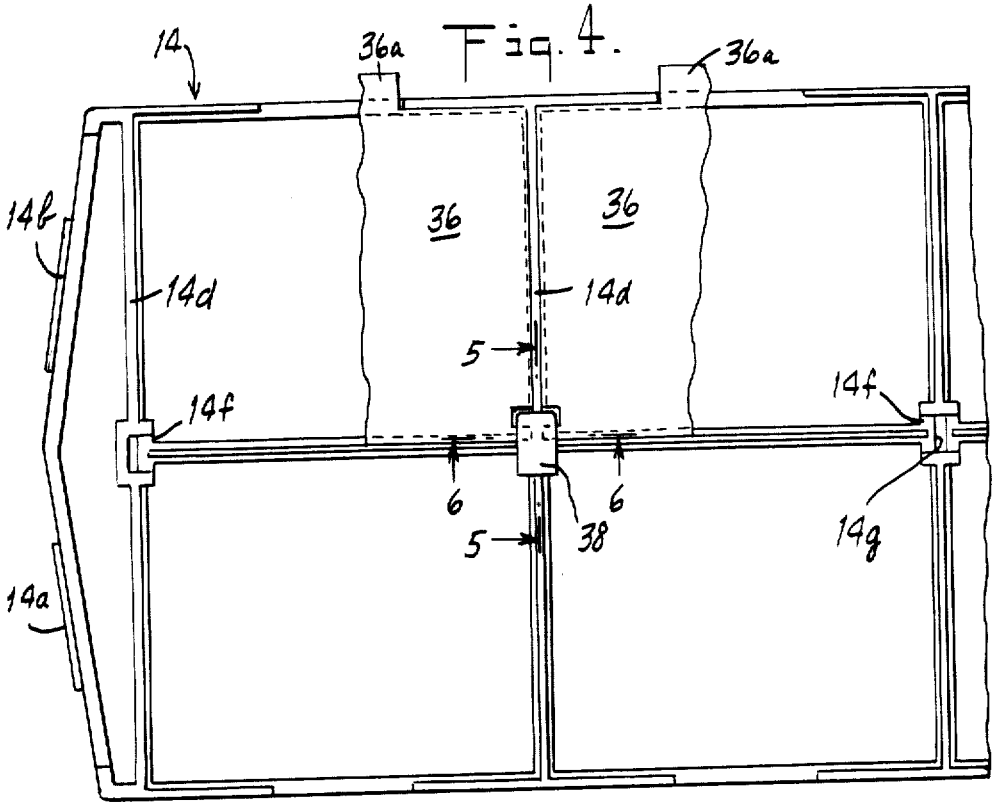
FIG. 4 is a partial top plan view of a sidetray forming a part of the sewing box.

Referring to FIGS. 1 and 2, the sewing box described herein as a non-limiting illustration of the invention comprises a central tray 10, a right sidetray 12 and an identical left sidetray 14, a front spool tray 16 and an identical back spool tray 18. A pocket panel 20 snaplocks onto spool panel 16 to form an external pocket 22 for items such as magazines and patterns, and an identical panel 24 similarly snaplocks to spool panel 18 to form a similar external pocket 26. The sidetrays and spool panels are pivotally mounted to the central tray to move between their closed positions illustrated in FIG. 1 and their open positions illustrated in FIG. 9. Spool panels 16 and 18 can be locked when in their closed position by means of slide locks 28 and 30 which are identical to each other and have the shape illustrated in FIG. 3. As seen in FIGS. 1 and 2, slide lock 28 partly encircles and rides on a rail 16a, which is a part of spool panel 16, to move between the open position shown in FIG. 2, at which it cannot engage spool panel 18, and the closed position shown in FIG. 1, at which it rides onto and partly encircles a rail 18a which is a part of spool panel 18, to thereby lock spool panels 16 and 18 to each other. Slide lock 30 interacts in the same manner with rail 18b on spool panel 18, and rail 16b on spool panel 16. A handle 32 is pivotally secured to spool panel 16, and an identical handle 34 is secured in the same manner to spool panel 18 such that for storage or shipment handles 32 and 34 can be folded to the position shown in FIG. 1, at which they are flush with the top surfaces of spool panels 16 and 18, respectively, and open positions at which they extend up from spool panels 16 and 18 and their ends which are remote in FIG. 1 are brought together. When the box is closed, tabs 12a and 12b of sidetray 12 and identical tabs 14a and 14b of sidetray 14 snaplock into matching, downwardly faced depressions into the underside of the top portions of spool trays 16 and 18 (see, e.g., items 100 and 102 in FIG. 9) to keep sidetrays 12 and 14 in their closed positions when spool panels 16 and 18 are closed. This snaplock connection can be released, to allow a sidetray to open, either by opening spool panels 16 and 18 or by keeping the spool panels closed but pressing down on the top surface of a sidetray, adjacent the tabs thereof, to deform the top surface slightly and move the tabs out of the matching depressions into the spool panels and thereby release the sidetray to allow it to pivot to its open position. Conversely, a sidetray can be locked in its closed position either by first moving the sidetray to its closed position and then closing the spool panels around it, or by first closing the spool panels and then moving the sidetray toward its closed position and pushing it into a snaplock with the spool panels. Of course, the material and construction of snaplocking tabs 12a, 12b, 14a and 14b, and of the adjacent portion of the respective sidetrays, must be somewhat resilient to allow for the tabs and sidetrays to be deformed slightly so as to snap lock into the closed position as well as to snap out of the closed position. In order to keep the sidetrays firmly locked in place when the box is closed, and particularly to prevent them from being pushed further into the closed box, tab 36a of clear plastic lids 36, which are secured to sidetrays 12 and 14, extend outwardly, thereof and remains on the outside of spool panels 16 and 18 when the box is closed, pressing against or at least adjoining the respective outer surfaces of the spool panels. In order to support any one or more of sidetrays 12 and 14 and spool panels 16 and 18 in the upright position without the need for support from other sidetrays or spool panels, central tray 10 has integrally molded ribs 10a–10g which extend inwardly from its side walls such that the sidetrays and spool panels abut against and are supported by them when in their upright positions.

Referring to FIG. 9, central tray 10 has integrally molded ribs 10i–10k extending upwardly from its bottom to divide it into a number of compartments of different sizes, from the longest compartment suitable for accessories such as scissors to short compartments suitable for other accessories such as a pin cushion, thimbles, tape measure, etc. Similarly, sidetray 14 is divided into a number of compartments, this time of identical size, by means of a central rib 14c and transverse ribs 14d. Sidetray 12 is also divided into compartments by identical ribs 12c and 12d, which are not visible in the drawing. The pivotal connection of a clear plastic lid 36 and a compartment of a sidetray is illustrated in FIGS. 4–8, and is accomplished by integrally molding the lid with hinge pins 36b and 36c which fit, in the example of the upper left compartment in FIG. 4, in hinge holes formed between lands 14f on top of the sidetray ribs and the underside of the head 38a of a pin 38 whose shank 38b fits within an opening 14g formed at the junction of central rib 14c and a transverse rib 14d. Pin 38 has a pair of barbs 38c and 38d at its bottom end which snaplock against lands 14h and 14i which are visible and accessible from the outside of tray 14. If needed, a pin 38 can be removed by squeezing the of barbs 38c and 38d toward each other and pushing pin 38 in the upward direction of FIG. 5. Tab 36a of lid 36 snaplocks (or friction-locks) into a corresponding, open top slot 14j in the sidewalls of sidetray 14. An identical cover 36 fits identically and snap locks identically over each compartment of tray 14 and over each compartment of identical sidetray 12.

Spool panel 16 has integrally formed spool spindles 16c arranged in a regular rectangular array. As best seen in FIG. 9, the geometric center of the array of spool spindles 16c is slightly offset to the right with respect to the geometric center of spool panel 16. Because spool panel 18 is identical, the result is that when spool panels 16 and 18 are closed, the free ends of any two opposing spool spindles, 16c and 18c (for example, the spindle at the upper left-hand corner of panel 16 and at the lower left-hand corner of panel 18 in FIG. 9) are offset from each other (e.g., by about ¼ inch). Because of this offset, the free end of each spindle keeps a spool on the opposing spindle from sliding off, for example, when the box is tipped over or laid on the opposite spool panel. In addition, the spool spindles are oriented such that when the spool panel is in its upright position, the spool spindles point slightly upwardly, above the horizon, to keep the spools thereon from sliding off by gravity.

The optional external panel 20 forming the optional pocket 22 for items such as magazines and patterns, snaplocks to spool panel 16 by means of resilient tabs 20a, 20b, 20c and 20d (see FIG. 15) which fit into corresponding depressions or openings integrally molded into the external surface of spool panel 16. One of the four identical openings is visible at 16d in FIG. 1.

Each of the following components of the sewing box is molded out of thermoplastic material as an integral unit: center tray 10, each of identical sidetrays 12 and 14, each of identical spool panels 16 and 18, each of identical slide locks 28 and 30, each of identical external panels 20 and 22, each of identical handles 32 and 34, each of identical clear plastic compartment lids 36 and each of identical pins 38 for forming hinge holes for lids 36.

In order to simplify the mold and the molding operation, and thereby reduce the ultimate cost of the sewing box, all of the hinge holes needed for the pivotal connection between center tray 10 and the sidetrays and spool panels are made by stationary mold components, without the use of movable cams. The result is best seen in FIGS. 13 and 14. Considering one of the hinge pin-hinge hole connections (the others being identical), a channel 101 is formed in a side wall of center tray 10 such that the depth of the channel is about half or slightly more of the thickness of the sidewall, and the upper extent of the channel is curved to form the upper half of a circular hinge hole 10m. A similar, but upside-down and shorter channel 10n, is formed into the opposite side of the same sidewall of center tray 10 such that the lower extent of channel 10n forms the lower half of hinge hole 10m. The channels 10l and 10n and formed in the molding process by mold cavity lands which are integral parts of the mold halves. This avoids the need for the more expensive, and sometimes troublesome, cam arrangements for making holes in molded item which are in a direction transverse to that in which the mold halves open to release the molded articles. Two such hinge holes are used for the pivotal connection between sidetray 12 and the right sidewall of center tray 10, and similar pairs of hinge holes and hinge pins are used for the remaining pivotal connections between the center tray and sidetrays and spool panel. Similar hinge holes (not shown) are similarly formed in the upper parts of spool panels 16 and 18 to receive the similarly integrally molded hinge pins of handles 32 and 34.

Figure 5:
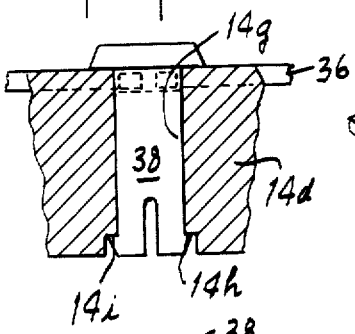
FIG. 5 is a partial sectional view along line 5—5 of FIG. 4.
Figure 6:
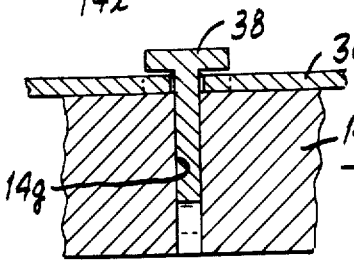
FIG. 6 is a partial sectional view along line 6—6 in FIG. 4.
Figure 7:
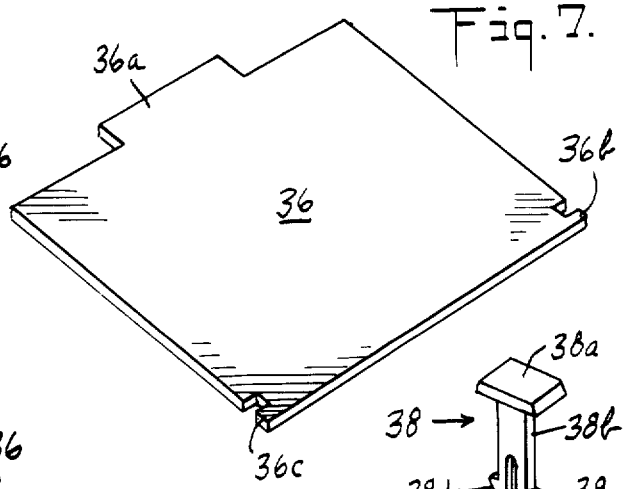
FIG. 7 is a perspective view of a clear plastic lid for a compartment in the sidetray of FIG. 4.
Figure 8:
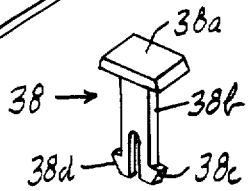
FIG. 8 is a perspective view of a T-shaped pin used in forming the hinge connection between the compartment lid of FIG. 7 and the sidetray of FIG. 4.

To assemble the sewing box from the molded components, clear plastic lids 36 are laid in their places over the compartments in side panels 12 and 14, with their tabs 36a snaplocked (or friction-locked) into openings 14j of sidetray 14 and similar openings into sidetray 12, and the pivotal connections of covers 36 to sidetrays 12 and 14 are completed by inserting a pin 38 into the opening at each intersection of the center rib and a transverse rib of sidetrays 12 and 14, to the position illustrated for an exemplary pin in FIGS. 5 and 6. Each of sidetrays 12 and 14 and spool panels 16 and 18 is pivotally secured to center tray 10 by deforming one or both slightly so that the hinge pins, such as hinge pin 12f in FIG. 13, snap into the matching hinge hole, such as hinge hole 10m in the same FIG. 13. Handles 32 and 34 are similarly pivotally secured to spool panels 16 and 18, respectively, by deforming one or both by hand such that the hinge pins on the handles snap into the matching hinge holes in the spool panels. Slide locks 28 are slid onto rails 16a and 18b, from the center toward the periphery of the respective spool panel. As rails 16a and 18b curve downwardly at their outward ends, a natural stop is provided for slide locks 28 and 30 to keep them from sliding off the rails when pushed outwardly. If the optional pockets 22 and 26 are desired, then external panels 20 and 24 are snap locked in place by slightly deforming the barbed extensions of tabs 20a–20d (and identical tabs on panel 24) and snap locking the external panels in place. Thus, the entire sewing box can be assembled by hand, without the use of any tools, any fasteners or adhesives, thereby simplifying and reducing the cost of assembly. As pairs of components are identical to each other (e.g., sidetrays 12 and 14) spool panels 16 and 18, external panels 20 and 24, handles 32 and 34 and slide locks 28 and 30) and are thereby interchangeable, there is no need to keep track of which is left or right or front or back in the manufacturing process or in any replacement of damaged or defective components. The same applies to the identical and therefore interchangeable compartment lids 36 and pins 38.

The sewing box can be packaged and shipped in the configuration shown in FIG. 1, with or without the optional external panels 20 and 24, but with handles 32 and 34 folded down to be flush with the top surface of spool panels 16 and 18 to thereby minimize shipping size. In use, the box can be carried from place to place by handles 32 and 34, by first pivoting them up about their hinges. Sidetray 12 can be released from its snap lock with spool trays 16 and 18 (while the spool panels remain locked) by pressing down on its top surface adjacent tabs 12a and 12b to deform it slightly and thereby release the snap lock connection, and can be then pivoted down about its hinge connection with center tray 10, to a horizontal or nearly) horizontal open position. The same procedure can be followed with respect to sidetray 14. Any compartment in sidetrays 12 and 14 can be opened by pulling on tab 36a of the respective clear plastic lid 36 to release it from its snaplock (or friction lock) connection with the respective opening such as 14j, and accessories such as needles, buttons, etc. can be stored or removed from the compartment. Lid 36 can be pushed down to re-establish the snaplock (or friction lock) connection with the opening such as 14j. If desired, sidetray 12 can be brought back to its closed and locked position while the spool panels remain locked, by pivoting sidetray 12 up and pushing it into its closed position such that tabs 12a and 12b deform slightly and then snaplock into the mating depressions in spool panels 16 and 18. A similar procedure can be followed for sidetray 14. To open spool trays 16 and 18, slide locks 28 and 30 are moved away from each other so that they move from their locked position shown in FIG. 1 to the opened position shown in FIG. 2, whereupon the spool panels can be pivoted away from each other to their open positions illustrated in FIG. 9. This, of course, releases the snap lock between the sidetrays and spool panels (assuming that at the time the sidetrays are in their up positions), but the sidetrays remain up because they are self-supporting on the ribs 10b', 10c, 10g and 10f of center tray 10. Spools or bobbins can then be loaded onto or removed from spool spindles 16c and 18c. If desired, one or both of spool panels 16 and 18 can be brought to the upright position to remain therein due to the self-support provided by ribs 10a, 10b, 10d, and 10e of center tray 10.

It should be appreciated that directional terms such as left, right, up, etc., are used for the orientations shown in the relevant figures, and have no other limiting significance. It should also be appreciated that numerous variations which still embody the invention are possible and are intended to be encompassed by at least some of the appended claims: for example, one (or each) of the right and left hinged components can be a spool panel instead of sidetray, one (or each) of the hinged front and back components can be a sidetray, etc.

I claim:

1. A sewing box comprising:

a rectangular central tray having a bottom and left, right, front, and back sidewalls extending up therefrom;

rectangular left and right sidetrays pivotally secured to the central tray's left and right sidewalls, respectively, to move between their open positions, at which they extend away from the central tray and each other, and their closed positions, at which they extend up from the central tray;

rectangular front and back spool panels pivotally secured to the central tray's front and back walls, respectively, to move between their open positions, at which they extend away from the central tray and each other, and their closed positions, at which they extend up from the central tray and adjoin at their top ends;

wherein said sidetrays and spool panels are shaped and dimensioned to form, with the central tray, a closed box when in their closed positions, and to form a cross-shaped configuration when in their open positions;

said sidetrays and spool panels having snaplocking interlock means normally preventing a sidetray from moving away from its closed position while the spool panels remain closed, said interlock means being released, to allow a sidetray to move away from its closed position, either when the spool panels are opened or when the sidetray is selectively and temporarily deformed by hand while the spool panels remain closed, and said interlock means being engaged, to keep a sidetray in its closed position, either by closing one or both spool panels while the sidetray is in its closed position, or by snaplocking the sidetray into an engagement with one or both closed spool panels by pressing it toward and into its closed position, whereby the sidetrays are normally secured at their closed position when the box is closed for storage or transportation, but can be opened and closed selectively whether or not the spool panels are opened;

a manually operable slide lock mounted on each spool panel to move between a locked position at which it engages the other spool panel when the panels are in their closed positions, to thereby lock the panels to each other, and an open position at which it does not engage the other spool panel and allows the closed box to be opened;

wherein each of the central tray, sidetrays and spool panels is integrally molded from thermoplastic material, and including hinge pins integrally molded as a part of the respective sidetrays and spool panels and hinge openings integrally molded in the central tray to receive said pins, to thereby pivotally secure the sidetrays and the spool trays to the central tray, said hinge openings having been molded without the use of hole-forming movable cams, and the two sidetrays are identical to each other and interchangeable and the two spool panels are also identical to each other and interchangeable, and wherein the recited components are assembled into the recited box by snaplock connections and without fasteners or adhesives.

2. A sewing box as in claim 1 wherein the central tray and the sidetrays include respective integrally formed ribs dividing them into storage compartments, wherein the ribs of each sidetray include a central rib transverse to the sidetray hinge axis, and including a transparent compartment lid for each sidetray compartment, each lid being pivotally secured to the central rib of the respective sidetray and having a tab extending outwardly of the sidetray, said tabs adjoining and remaining outside the spool panels when the box is closed, whereby the juxtaposition between the lid tabs and the spool panels keeps the sidetrays from moving further into the closed box while the interlock means normally keeps the sidetrays from moving in the opposite direction, out of their closed position, while the spool panels remain closed, and wherein the ribs in the central tray include portions maintaining upright any sidetray and spool panel which is in its closed position, even when no other support is provided.

3. A sewing box as in claim 2 wherein each spool panel includes an array of integrally molded spool spindles which extend toward the other spool panel when the panels are in their closed positions, and point up, above the horizon, to prevent spools from sliding off the spindles by gravity from a spool panel which is in its upright position, the spool spindles of each spool panel being in an array which is offset with respect to the center of the spool panel, wherein, although the spool panels are identical to each other, when they are in their closed positions, the free ends of the spool spindles of one array are adjoin but are offset from the free ends of the spool spindles of the other array such that a spindle on one panel keeps a spool on the matching spindle of the other panel from sliding off therefrom when the spool panels are in their closed positions.

4. A sewing box comprising:

a central tray having a bottom wall and four sidewalls extending up therefrom;

a pair of sidetrays pivotally secured to a pair of opposing sidewalls of the central tray to move between their open positions, at which they extend substantially horizontally and away from the central tray and each other, and their closed positions, at which they extend up from the central tray;

a pair of spool panels pivotally secured to the remaining pair of sidewalls of the central tray to move between their open positions, at which they extend substantially horizontally and away from the central tray and each other, and their closed positions, at which they extend up from the central tray;

wherein said sidetrays and spool panels are shaped and dimensioned to form, together with the central tray, a closed box when in their closed positions, and to form a cross-shaped configuration when in their open positions, a first one of said pairs of sidetrays and spool panels having means for selectively locking the two components to each other when they are in their closed positions to maintain them in their closed positions and for selectively unlocking them to permit them to move from their closed to their open positions, and the first pair of components and the remaining, second pair having snaplocking interlock means which engage the four components to each other when they are in their closed positions to thereby keep the box closed, said interlock means engaging by starting with the components of the second pair in their closed positions and closing the components of the first pair around them or by starting with the components of the first pair in their closed positions and snap-locking the components of the second pair therewith by moving the components of the second pair toward and into their closed positions, and said interlock means disengaging either by opening the components of the first pair to thereby release the components of the second pair or by selectively and temporarily deforming the components of the second pair by hand while the components of the first pair remain closed and moving the components of the second pair out of their closed and toward their open positions;

wherein at least one of the spool trays comprises an array of spool spindles extending into the closed box and adapted to support spools and wherein at least one of the sidetrays includes a number of compartments for sewing accessories and including lids movable between closed positions at which they close the sidetray compartments to keep the contents thereof in place and open positions at which they allow access to the compartments.

5. A sewing box as in claim 4 in which the two side trays are identical to each other and are interchangeable, and the two spool panels are also identical to each other and interchangeable, and wherein each of the central tray, sidetrays and spool panels is integrally molded from thermoplastic material and the recited components of the box are assembled by snaplocking connections.

6. A sewing box as in claim 5 including a pair of panels snaplocking into the spool panels to form external, open-top pockets for articles such as magazines and sewing patterns.

*7. A sewing box comprising:*

*a central tray;*

*left and right sidetrays, each secured to the central tray to pivot relative thereto between a closed position, in which it extends upwardly at least in part above the central tray, and an open position, in which it extends laterally at least in part away from the central tray;*

*front and back spool panels, each secured to the central tray to pivot relative thereto between a closed position, in which it extends upwardly at least in part above the central tray, and an open position, in which it extends laterally at least in part away from the central tray;*

*wherein when in their closed positions the sidetrays and the spool panels form, together with the central tray, a substantially closed box, and when in their open positions form, together with the central tray, an open-top, cross-shaped structure;*

*wherein each of the central tray, the sidetrays and the spool panels is a respective integrally molded unit made of a thermoplastic material, each of the central tray and the sidetrays has respective ribs which are integrally molded therewith and divide it into a number of compartments, each spool panel has a number of spool spindles which are integrally molded therewith and extend toward the other spool panel when the spool panels are in their closed positions, and the sidetrays have respective lids pivotally mounted thereon to move between respective closed positions, in which they close the compartments of the respective sidetrays, and open positions, in which they allow access to the compartments of the respective sidetrays;*

*a respective slide lock mounted on each spool panel to move between an open position and a closed position, wherein when the spool panels are in their closed positions and a slide lock mounted on one of them is moved from its open toward and into its closed position it engages the other spool panel to thereby keep the spool panels in their closed positions, and wherein each slide lock engages only one spool tray when in its open position, whereby the spool panels can move from their closed positions toward their open positions when both slide locks are in their open positions; and*

*a pair of handles, each mounted on a respective one of the spool panels to pivot relative thereto between an open position and a closed position, wherein each spool panel has a handle recess which receives the respective handle when it is in its closed position such that the handle is substantially flush with the surface of the respective spool tray into which the respective recess is formed, wherein the two handles extend laterally away form each other when in their closed positions and extend upwardly next to each other when in their open positions;*

*means for snap-mounting said handles on the respective spool panels, and interlock means integrally formed together with said sidetrays and spool panels for securing the sidetrays to the spool panels when the spool panels are moved from their open positions to their closed positions while the sidetrays are in their closed positions;*

*wherein the two sidetrays are identical to each other and are interchangeable, and the two spool panels also are identical to each other and are interchangeable, and the sidetrays and the spool panels are secured to the central tray by snaplocking connections.*

*8. A sewing box as in claim 7 in which each spool panel includes a first rail and a second rail integrally formed at the end thereof opposite that pivotally secured to the central tray, each slide lock partly encircles and rides along the first rail of a respective one of the spool trays and when in its open position clears the second rail of the other spool panel when the spool panels are in their closed positions but when in its closed position engages the second rail of the other spool panel when the spool panels are in their closed positions.*

*9. A sewing box as in claim 8 in which when the sidetrays and spool panels are in their closed positions the box is substantially rectangular in plan view and in each elevational view.*

*10. A sewing box as in claim 9 in which the interlock means for securing the sidetrays to the spool panels comprise recesses in the spool panels shaped, dimensioned and positioned to receive respective mating portions of the sidetrays when the spool panels are moved from their open to their closed positions while the sidetrays are in their closed positions.*

*11. A sewing box as in claim 10 in which the spool panels are substantially L-shaped in cross-section and have top ends which adjoin each other when the spool panels are in their closed positions.*

*12. A sewing box as in claim 11 in which the spool panels when moving between their open and closed positions clear the sidetrays so long as the sidetrays remain in their open positions, whereby the spool panels can be moved to and locked into their closed positions while the sidetrays remain open and their contents remain accessible.*

* * * * *